United States Patent [19]

Peruzzo

[11] Patent Number: 4,972,666
[45] Date of Patent: Nov. 27, 1990

[54] GRASS CUTTING MACHINE WITH TIP-UP BOX

[75] Inventor: Adriano Peruzzo, Padova, Italy

[73] Assignee: Offucine Meccaniche Peruzzo Adriano, Padova, Italy

[21] Appl. No.: 420,269

[22] Filed: Oct. 13, 1989

[30] Foreign Application Priority Data

Oct. 14, 1988 [IT] Italy .................. 30736/88[U]

[51] Int. Cl.⁵ .................................. A01D 34/48
[52] U.S. Cl. ........................ 56/206; 56/202; 56/203
[58] Field of Search ............ 56/16.6, 199, 200, 202, 56/203, 206

[56] References Cited

U.S. PATENT DOCUMENTS

| | | | |
|---|---|---|---|
| 3,753,340 | 8/1973 | Mathews | 56/200 |
| 3,837,157 | 9/1974 | Van Der Lely | 56/202 X |
| 4,487,007 | 12/1984 | Mullet et al. | 56/202 X |
| 4,709,541 | 12/1987 | Broman et al. | 56/202 |
| 4,731,983 | 3/1988 | Yuki et al. | 56/202 |

*Primary Examiner*—George A. Suchfield
*Attorney, Agent, or Firm*—Hoffman, Wasson, Fallow & Gitler

[57] ABSTRACT

Grass cutting machine with tip-up box comprising a frame (1) mounted on wheels (2) and supporting a horizontal shaft (3) provided with rotating blades (4) and a box (8), movable from a lower position for collecting the cut grass to an upper position for discharging the cut grass into a dumper. The box (8) is upperly provided with a hinged cover (12) and is connected to the frame (1) by two telescopic guides (13), to the upper end of which it is joined so that it can be tipped up at the end of the lifting stroke and discharge the cut grass into the dumper, through the aperture closed by said cover and directed downwards, following to said tipping.

5 Claims, 2 Drawing Sheets

GRASS CUTTING MACHINE WITH TIP-UP BOX

The present invention relates to a grass cutting machine with tip-up box.

Many of the grass cutting machines currently available on the market are provided at the rear with a raisable tip-up box for discharging the cut grass onto lorries or other dumping vehicles.

The box is linked to the main structure of the grass cutter by means of arms connected to hydraulic system for raising it above the upper edge of the dumper of a vehicle.

The grass is discharged from the bottom of the box which, when raised, is opened by hydraulic devices.

These grass cutters have several drawbacks, both from the practical and economic point of view as the hydraulic jacks and supporting system with arms involve high production costs and lengthy assembly procedures.

Another drawback of this type of machine is that when unloading, the box movement system does not allow the box to reach the heights and extensions required by normal dumpers of vehicles.

The object of the invention is to eliminate all the above drawbacks and in particular to produce a quick-assembly grass cutting machine with tip-up box which can be manufactured at low cost.

Another aim of the invention is to produce a grass cutting machine with a large capacity box, provided with very simple operation systems but which at the same time enable it to reach the heights and extensions required by practically all dumpers currently in use.

There aims and others which will be evident from the following description are attained according to the invention by a grass cutting machine with a tip-up box comprising a frame mounted on wheels and supporting a horizontal shaft provided with rotating blades and a box movable from a lower position for collecting the cut grass to an upper position for discharging the cut grass into a dumper, characterised in that the box is upperly provided with a hinged cover and is connected to the frame by two telescopic guides, to the upper end of which it is joined so that it can be tipped up at the end of its lifting stroke and discharge the cut grass into the dumper, through the aperture closed by said cover and directed downwards following to said tipping.

Further details are given below with reference to the enclosed drawings in which.

Figure 1:
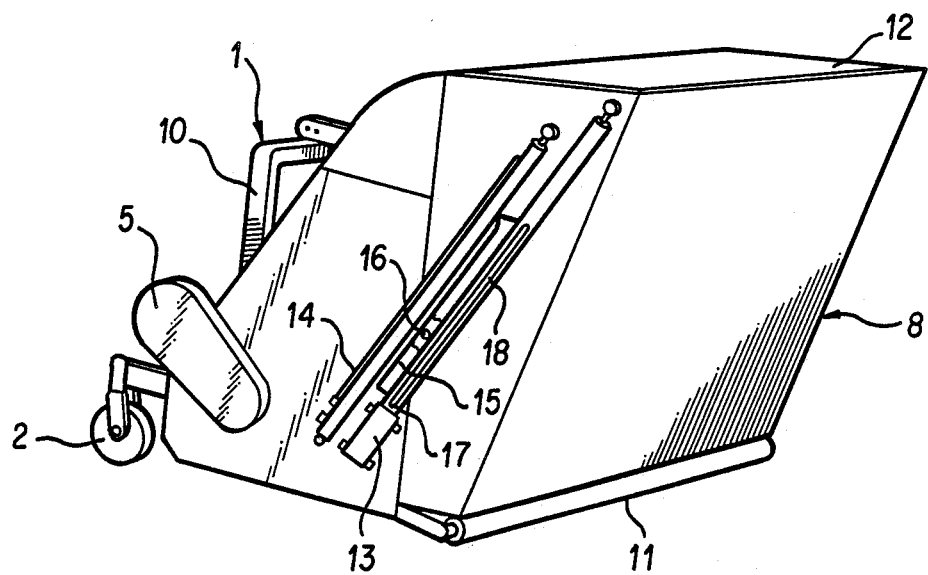
FIG. 1 shows the machine in perspective view with the box lowered.

As can be seen from the figures, the grass cutting machine according to the invention substantially comprises a frame 1 mounted on wheels 2 and supporting a horizontal shaft 3 provided with blades 4. The shaft 3 is rotated by a system of belts and pulleys 5 driven by the towing vehicle, not shown in the drawings.

The shaft 3 with the blades 4 rotates inside a space 3' defined at the front by a dividing structure 6, at the rear by the front wall 7 of a box 8 and laterally by two side elements. The upper part of the dividing structure 6 defines together with the upper part of the front wall 7 a communication channel 9 between the space 3', housing the shaft 3 and the blades 4, and the inside of the box 8.

A connection device 10 is fitted to the front of the frame 1 for coupling to the towing vehicle and a horizontal levelling roller 11 is applied at the rear. The wheels 2 are of revolving and height-adjustable kind.

The box 8 is upperly closed by a hinged cover 12, articulated near its front horizontal edge to the rest of the same box 8 which is connected to the side walls to the frame 1 by means of two telsecopic guides 13. Two hydraulic jacks 14 parallel to the guides 13 connect the box 8 to the frame 1.

Each telescopic guide 13 is provided at the side with a wing 15 on which slides a pin 16 protruding from the corresponding side wall of the box 8 to ensure a translatory lifting of the box at the beginning of the stroke.

The operating of the machine is as follows: the frame 1 is coupled, by means of the connection device 10 to the towing vehicle, to which the ducts for driving the jacks 14 and movement transmission devices of the horizontal shaft 3 are also connected.

The grass is cut by rotation of the shaft 3 with the connected blades 4 which slide on the soil at a height which can be varied by vertically adjusting the wheels 2 or the connection device 10, as the operator prefers.

The movemnet of the blades 4 pushes the cut grass through the channel 9 into the box 8 which is in the lowered position with its side walls inside the walls of the space 3'.

When the box has been filled, the machine is positioned next to the dumper and the jacks 14 lift the box 8, guided by the telescopic guides 13 and by the engagement of the pins 16 with the guide wings 15.

Figure 3:
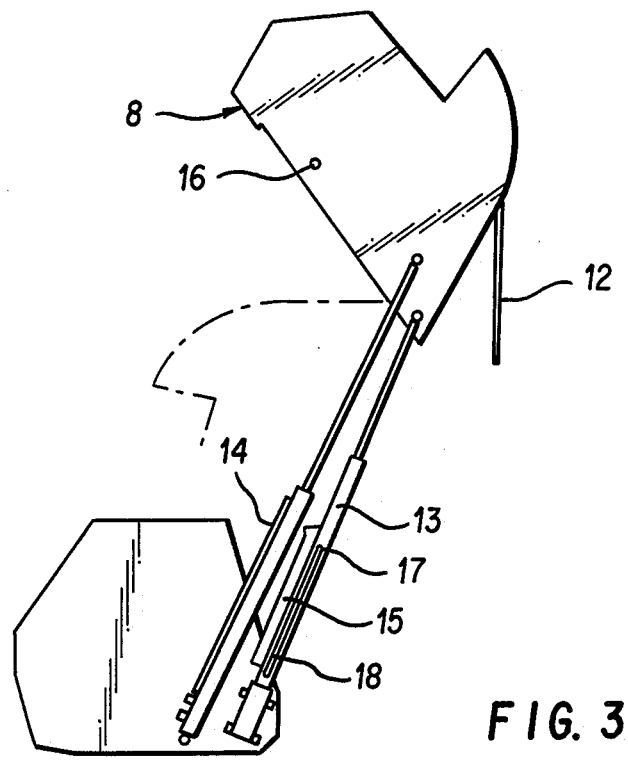
FIG. 3 is the same view as FIG. 2 but with the box completely raised and tipped up.
Figure 2:
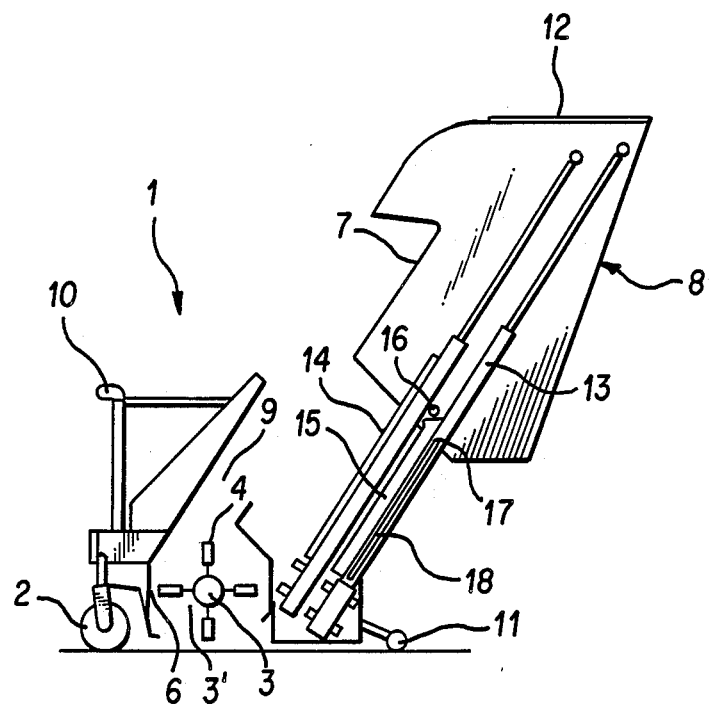
FIG. 2 is a side view with the box partially raised.

When the guides 13 have reached their maximum length, allowed by stop elements 17 running inside oval-shaped slot guides 18, the box 8 stops and a further thrust from the jacks 14 tips up the box around the articulation axis of the guides 13 (see FIG. 3).

Following to this rotation, the cover 12 rotates due to gravity around its articulation hinge, thus causing the discharge of the grass in the underlying dumper.

Once the box 8 has been discharged, a reverse command to the jacks 14 brings the box back, in the opposite sequence, to its original position.

From the above, it is evident that the grass cutting machine according to the invention has several advantages, and in particular:

it is simple and economical to produce, it has simple and reliable box movements, it enables the box to reach pratically any height and extension required.

What is claimed is:

1. In a grass cutting machine with a tip-up box, said machine comprising a frame (1) mounted on wheels (2) and supporting a horizontal shaft (3) provided with rotating blades (4) and a box (8), movable from a lower position for collecting cut grass to an upper position for discharging the cut grass into a receptacle, the improvement wherein the box (8) has an aperture and is upperly provided with a hinged cover (12) for said aperture, and is connected to the frame (1) by two telescoping guides (13), to the upper end of which it is joined at respective pivot points, so that it can be tipped up at the end of the lifting stroke to discharge the cut grass into the receptacle, through the aperture closed by said cover and directed downward following said tipping, and at least one hydraulic lifting jack (14) placed between the box (8) and the frame (1), said jack having an extension greater than the maximum permitted by the telescoping guides (13), said jacks being joined to the sides of the box (8) at points different from its pivot points to the telescoping guides (13).

2. A grass cutting machine as claimed in claim 1, wherein each telescopic guide is provided with a stop for limiting its maximum extension; said stop comprising a pin (17) integral with one of the two guide elements and running inside a longitudinal oval-shaped slot guide (18) in the other element.

3. A grass cutting machine as claimed in claim 1, wherein each telescopic guide (13) is provided with a wing (15) affixed thereto. upon which slides a pin 16 protruding from a corresponding side wall of the box (8) during its lifting, to keep said aperture faced upwards.

4. Grass cutting machine as claimed in claim 1 characterized in that the cover (12) is hinged, near its transversal front edge, to the box (8).

5. The invention of claim 1, comprising two of said jacks, one disposed on either side of said box.

* * * * *